April 13, 1937.  N. F. FRETTER  2,076,716
SEALING MEANS
Filed Jan. 29, 1936      3 Sheets-Sheet 1

INVENTOR.
Nathan F. Fretter
BY Geo. B. Pitts
ATTORNEY.

April 13, 1937.   N. F. FRETTER   2,076,716
SEALING MEANS
Filed Jan. 29, 1936   3 Sheets-Sheet 2
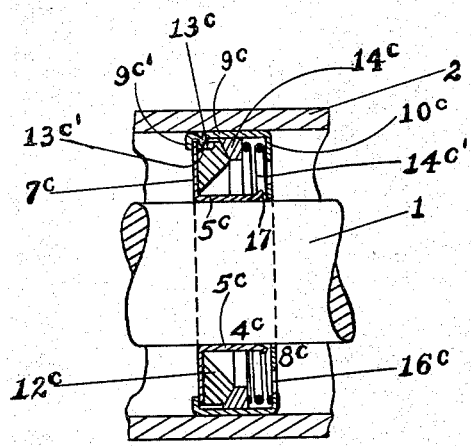
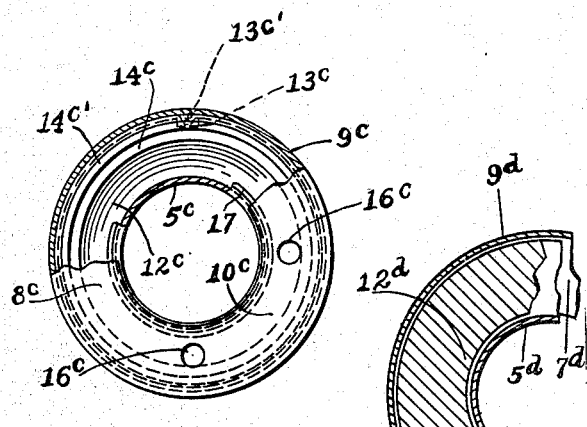
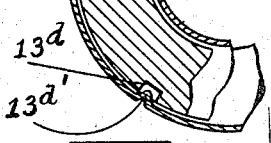
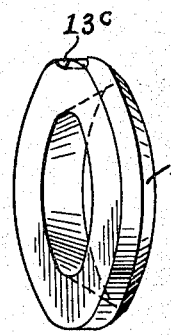
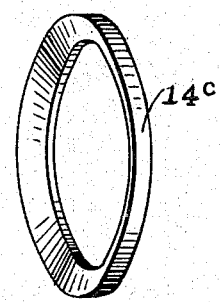
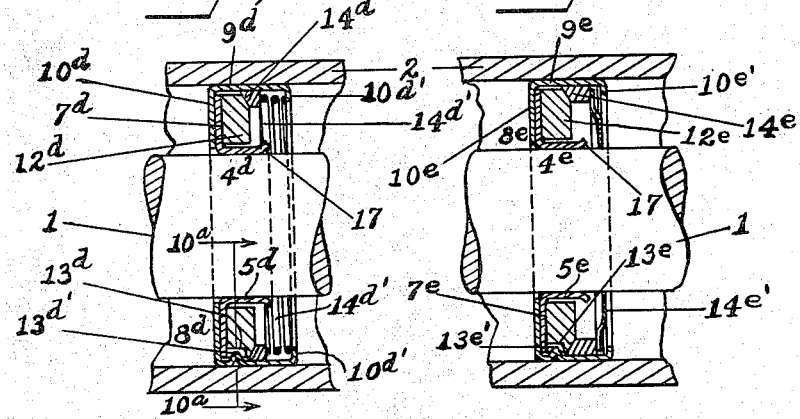
INVENTOR.
Nathan F. Fretter
BY Geo. B. Pitts
ATTORNEY.

April 13, 1937.   N. F. FRETTER   2,076,716
SEALING MEANS
Filed Jan. 29, 1936   3 Sheets-Sheet 3
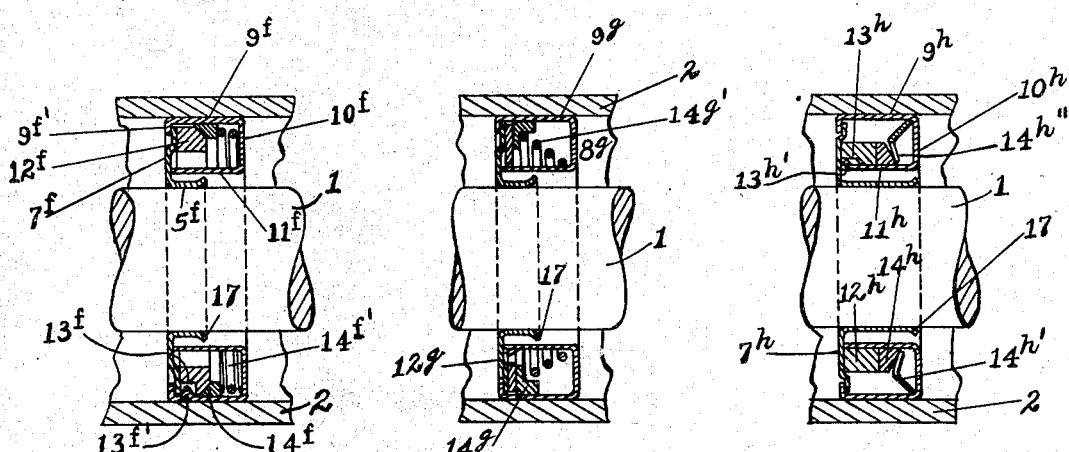
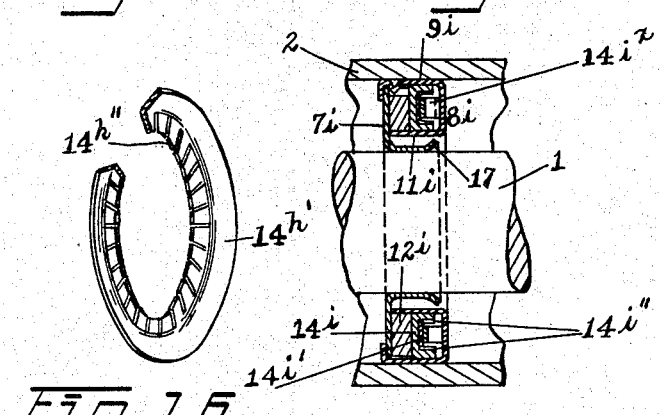
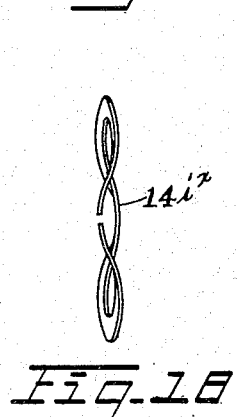
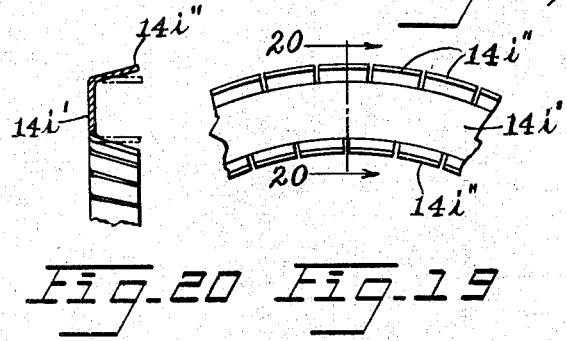
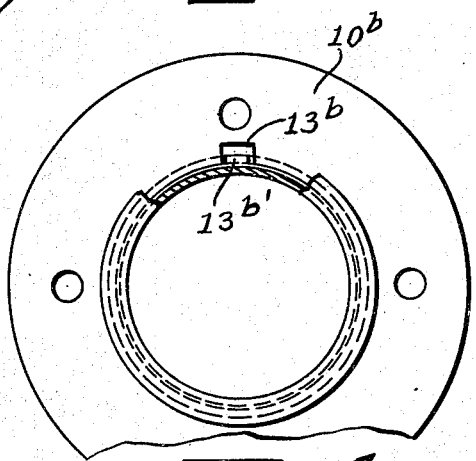
INVENTOR.
Nathan F. Fretter
BY Geo. A. Pitts
ATTORNEY.

Patented Apr. 13, 1937

2,076,716

UNITED STATES PATENT OFFICE 2,076,716

SEALING MEANS

Nathan F. Fretter, Cleveland Heights, Ohio

Application January 29, 1936, Serial No. 61,351

14 Claims. (Cl. 286—7)

This invention relates to sealing means arranged between relatively rotatable members for preventing flow or leakage of fluids due to gravity, capillary attraction or difference in pressure and for excluding dirt, grit and other foreign matter.

One object of the invention is to provide an improved sealing means of this character wherein the relatively movable contacting parts are formed of metal to insure effective sealing for a long period of time without renewal or replacement or repairs.

Another object of the invention is to provide an improved sealing means of this character wherein the elements, which engage the walls of the relatively rotatable members, have a pressed fit therewith and are capable of installation as a unitary device.

Another object of the invention is to provide an improved sealing means having relatively movable contacting parts formed of metal and a packing so arranged as to be in contact with relatively stationary parts or walls at all times to avoid friction or wear.

Another object of the invention is to provide an improved sealing means of this character having relatively movable contacting parts formed of metal so arranged and related that any existing pressure on one side of the sealing means will serve to increase the sealing relation between these parts.

Another object of the invention is to provide an improved sealing means comprising metallic sealing elements having portions fixedly related to the relatively movable members respectively and having other portions related to form a seal.

Another object of the invention is to provide an improved sealing means of simplified and economical construction capable of ready assembly and installation.

Other objects of the invention will be apparent to those skilled in the art to which my invention relates from the following description taken in connection with the accompanying drawings, wherein Fig. 1 is a section view of a sealing means embodying my invention.

Fig. 4a is a view of the sealing means shown in Fig. 4, parts being broken away.

Fig. 5 is a view similar to Fig. 1, but showing a different embodiment of the invention, Fig. 6 is an elevational view of the sealing means shown in Fig. 5, parts being broken away.

Figs. 7, 8 and 9 are views of parts of the sealing means shown in Figs. 5 and 6.

Figs. 10 and 11 are views similar to Fig. 1, but showing other embodiments of the invention.

Fig. 10a is a fragmentary sectional view taken along line 10a—10a of Fig. 10.

Fig. 12 is a detail view of the spring member shown in Fig. 11.

Figs. 13, 14 and 15 are views similar to Fig. 1, but showing additional embodiments of the invention.

Fig. 16 is a detail view of the spring member shown in Fig. 15.

Fig. 17 is a sectional view showing another embodiment.

Fig. 18 is a detail view of the spring member shown in Fig. 17.

Fig. 19 is a fragmentary view of the annular support shown in Fig. 17.

Fig. 20 is a section on the line 20—20 of Fig. 19.

Fig. 21 is a detail view.

Figure 1:
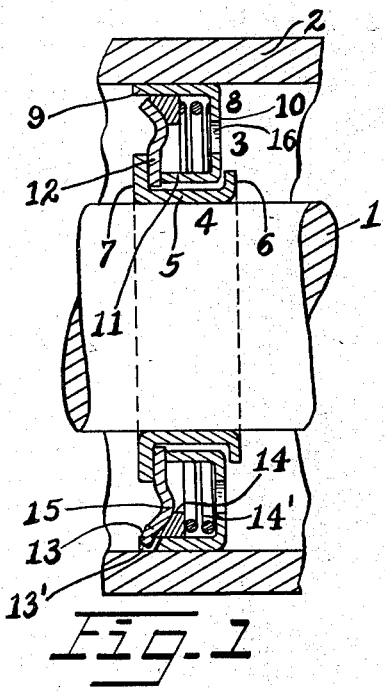

In the drawings, 1, 2, indicate inner and outer relatively rotatable members, either of which may be rotated relative to the other. These members may comprise a shaft and a tubular housing, the space between them being sealed by a sealing means indicated as an entirety at 3 to prevent flow or leakage of a fluid, either liquid or gas, due to gravity, capillary attraction or difference in pressure between the opposite sides of the sealing means and to prevent transfer of dirt, grit and other foreign matter past the sealing means. In one preferred application of the invention, the sealing means may prevent leakage and waste of a lubricant and prevent foreign matter from getting into the lubricant.

In the following description and the claims, the inner member will be referred to as a shaft or driven shaft and the outer member as a housing but such terms are to be considered and used merely as descriptive and not as limiting the invention.

The sealing means comprises generally (a) related relatively rotated, metallic sealing elements, certain of which have pressed-on fit or engagement with the walls of the members, whereby they are secured thereto, respectively, (b) a packing in engagement with adjacent walls of certain of the elements to seal them and (c) when found desirable, a spring to normally press the packing in sealing position.

In this form of construction, certain advantages are present and attained: For example, the sealing elements are formed of metal and therefore are capable of use for a long period of time, permit of high speeds of the shaft without danger of overheating and are not readily affected by grit or other foreign matter; the metallic sealing elements permit of relative movement between them transversely due to any eccentricity between the relatively movable members; those portions of the elements which engage the walls of the shaft and housing have a pressed fit engagement therewith and sealed relation thereto; the sealing is equally effective when the shaft is at rest as it is when the shaft is rotating; the sealing means may be assembled and then installed as a unitary structure without undue distortion or permanent deformation; the packing does not engage under pressure or otherwise with a moving wall and therefore it is not subject to friction and resulting wear; and the sealing means comprise readily fabricated parts certain of which are formed of sheet metal.

Figure 2:
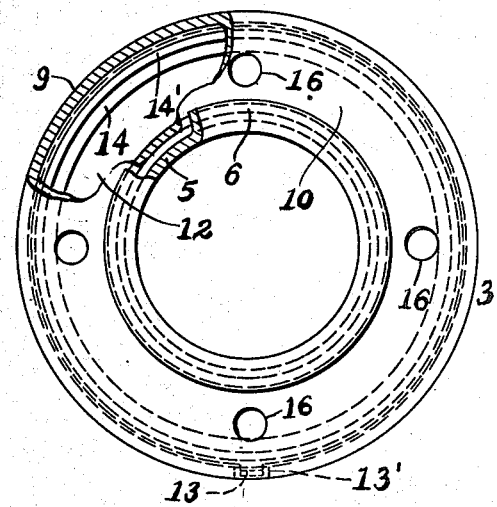
Fig. 2 is an elevational view of the sealing means, parts being broken away.

Referring to Figs. 1 and 2, the sealing means 3 consists of the following: 4 indicates a metallic sealing element having (a) an annular side wall 5 which has a pressed-on fit or engagement with the wall of the shaft 1 so as to rotate therewith and (b) outwardly extending flanges 6, 7, around its opposite ends, the latter being somewhat wider than the flange 6. 8 indicates a metallic sealing element having (a) an annular outer side wall 9 which has a pressed-on fit or engagement with the inner wall of the housing 2 so as to be fixed thereto, (b) an annular end wall 10 preferably disposed at right angles to the wall 9 and in a plane inwardly of the flange 6 and (c) an inner annular side wall 11 extending inwardly from the inner edge of the wall 10 and disposed concentric to the wall 5. 12 indicates a separate metallic annular sealing element forming the opposite end wall for the element 8 and disposed around its inner edge between the flange 7 and free circumferential edge of the wall 11. At one side, the wall 12 has an extension 13, which fits into a recess 13' formed in the wall 9, whereby the wall 12 is interlocked to the latter, and thus held against rotation relative to the element 8. More than one pair of interlocking devices 13—13' may be provided if desired. The space between the free circumferential edge of the wall 11 and inner face of the flange 7 is arranged to accommodate the inner marginal portion of the wall 12. By making the flange 7 relatively wide a large wearing surface between it and the wall 12 results. 14 indicates a packing at the joint between the walls 9 and 12 and extending circumferentially therearound. The packing 14 is preferably yieldably held in position by a coiled spring 14' disposed between it and the end wall 10. The spring 14' acts through the packing to normally press the wall 12 into sealing relation with the flange 7. To provide a seat for the packing 13, the wall 12 is embossed inwardly circumferentially, as shown at 15 adjacent its outer marginal edge. The end wall 10 may be provided with a plurality of openings 16 to admit liquid or gas so that if the latter is under pressure it will supplement the sealing action of the packing under the influence of the spring 14'.

It will be noted that (a) the sealing elements 4, 8 and 12 are combined into a unitary assembly which may be positioned as a unit with the walls 5 and 9 in engagement with the shaft 1 and housing 2, respectively; and (b) the members 4, 8 and 12 are formed of sheet metal, whereby they are economically fabricated, may easily compensate for any eccentricity of the relatively movable members and are capable of ready installation.

Figure 4:
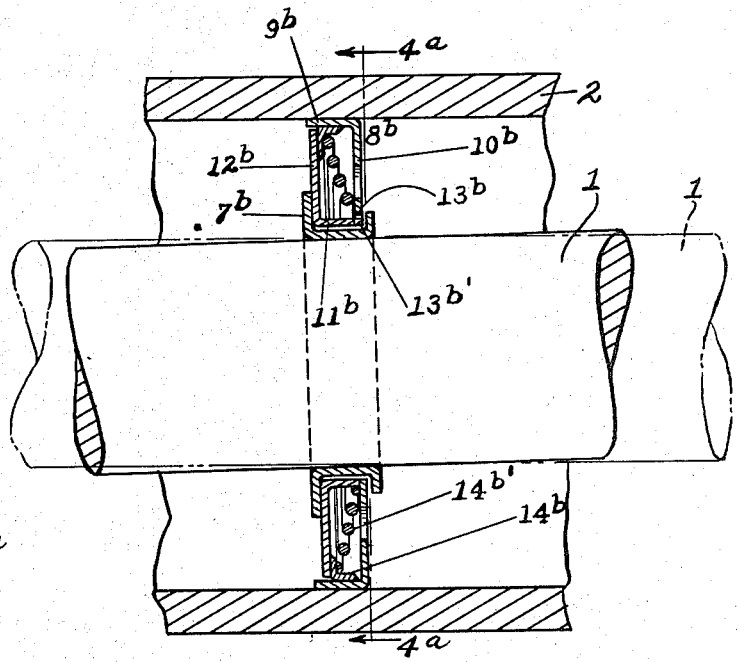

The elements of the sealing means are so related that any disalignment of the members 1, 2, as illustrated in dotted lines in Fig. 4, is compensated for.

Figure 3:
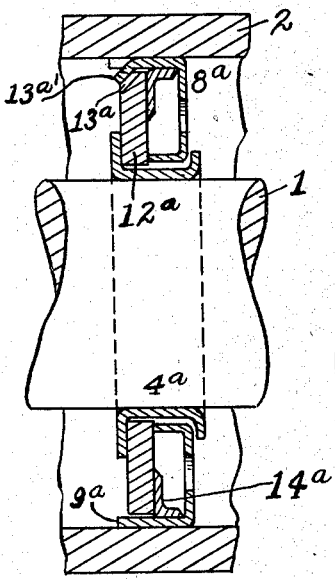
Figs. 3 and 4 are views similar to Fig. 1, but showing different embodiments of the invention.

Fig. 3 shows a different embodiment of the invention where the metallic end wall, which has sealing relation with the inner sealing element, is relatively thick, as shown at 12a. This form of construction is advantageous where the sealing means is used to maintain a vacuum or to prevent the escape or leakage of a gas or liquid under pressure. The interlocking elements between the end wall 12a and outer side wall 9a are shown reversed as compared to the interlocking elements 13—13' in Figs. 1 and 2, in that the wall 12a is formed with a recess 13a and the wall 9a is slitted to form a lug 13a' which is bent inwardly into the recess 13a. In this application of the sealing means the packing 14a is held in position by the pressure of the liquid or gas, as the case may be, for which reason a spring for engagement with the packing 14a is omitted.

Fig. 4 illustrates a different embodiment in which the inner side wall, shown at 11b, of the element 8b is formed integral with the separate end wall, shown at 12b. In this arrangement the edge portion of the end wall shown at 10b is formed with a notch 13b and the edge portion of the wall 11b is provided with an extension 13b' which fits into the notch to interlock the elements together. The packing 14b is positioned similarly to that shown in Figs. 1, 2 and 3, but is preferably yieldably held in position by a coiled spring 14b' having helical convolutions so as to expand in a diagonal direction on a line substantially the resultant of which the walls 9b and 12b are components. The outer convolution of the spring 14b' is arranged to expand circumferentially in its plane, so that when in position, as shown, the outer convolution also tends to press the outer portion of the packing 14b radially throughout its circumference. Accordingly, the spring acts on the outer portion of the packing and inner portion thereof and also acts through the packing to press the wall 12b toward and into sealing relation with the wall 7b. In this form of construction it will be noted that the walls 9b—10b are of angle shape in cross section and that the walls 11b—12b are of similar shape in cross section and therefore each part may be readily formed.

Figs. 5, 6, 7, 8 and 9 show a different embodiment of the invention in which the metallic sealing element which is connected to the housing 2 consists of a side wall 9c having a pressed-on fit or engagement therewith and at one end an end wall 10c and the metallic sealing element which is connected to the shaft 1 consists of a side wall 5c one circumferential edge of which terminates adjacent the inner edge of the end wall 10c and around its other circumferential edge it is provided with a flange 7c arranged to serve as an end wall, its free edge terminating adjacent the opposite end of the wall 9c, which by preference is provided with an inwardly extending flange 9c' disposed on the outer side of the end wall 7c. 12c indicates an annular metallic element having a surface engaging with the wall 7c to provide a seal. The member 12c is interlocked to the wall 9c, for example, by means of a recess 13c formed in the element 12c and a lug 13c' struck up from the metal of the wall 9c. 14c indicates a packing which engages with the rear wall of the ele- -ment 12c and wall 9c, and is yieldably held in position by a spring 14c' disposed between it and the end wall 10c. In the arrangement shown, the wall of the element 12c, which engages the wall 7c, has an effective area substantially equal to that of the wall 7c. The end wall 10c is formed with a plurality of inlet openings 16c.

Fig. 10 shows another embodiment of the invention wherein the sheet metal sealing elements 4d, 8d, which have fixed relation to the shaft 1 and housing 2, respectively, are of substantially the same shape in cross section as the members 4c, 8c, respectively, above referred to, but one is nested within the other, that is, their end walls 10d, 7d, are in substantially face to face relation and the metallic sealing element 12d is supported against the wall 7d in concentric relation to the side wall 5d of the element 4d by the pressure of the coiled spring 14d', which yieldably engages the packing 14d, to effect a sealing of the element 12d against the end wall 7d. The joint between the outer side wall of the element 12d and side wall 9d of the member 8d, is sealed by the packing 14d. That end of the wall 9d remote from its end wall 10d is provided with an inturned flange 10d' which forms a suitable abutment for the outer end of the spring 14d'. The sealing element 12d is formed at one side with a notch 13d into which a lug 13d' (the latter being struck up from the metal of the wall 9d), extends to lock the element 12d against rotation relative to the sealing element 8d. Fig. 11 shows a construction similar to that shown in Fig. 10, except that instead of a coiled spring for engagement with the packing 14e I provide an annulus 14e' formed of resilient sheet metal, its outer marginal portion being disposed between the packing 14e and the inturned flange 10e' of the element 8e and having spaced portions 14k off-set laterally to one side of its normal plane, which portions yieldingly engage the flange 10e' and packing 14e and thus normally act on the latter and through it to press the element 12e into sealing engagement with the wall 7e. The annulus also serves as an end wall for the element 8e.

In Fig. 13, which illustrates another embodiment of my invention, the inner metallic sealing element consists of a side wall 5f having a pressed-on engagement with the shaft 1 and an integral end wall 7f formed of sheet metal. The outer sealing element consists of an outer side wall 9f having a pressed-on engagement with the inner wall of the housing 2, an end wall 10f at one end and an inturned inner side wall 11f disposed outwardly of but concentric to the wall 5f, the walls 9f, 10f and 11f being integrally connected and formed from sheet metal. The opposite end of the wall 9f is preferably provided with an inwardly extending flange 9f' and the outer marginal portion of the wall 7f is shown as off-set to receive the flange 9f'. One end face of the separate metallic sealing element 12f engages the inner face of the end wall 7f to effect sealing. Around the opposite end of the element 12f adjacent its outer face it is preferably provided with a beveled surface which co-acts with the wall 9f to form a seat for a suitable packing 14f, the packing being held to its seat by a coiled spring 14f'. At one side, the outer wall or face of the element 12f is formed with a notch or recess 13f to receive a lug 13f' formed by upsetting or embossing the sheet metal wall 9f, whereby the sealing element 12f is interlocked to the wall 9f and held against rotation relative thereto. Fig. 14 shows a form of construction similar to Fig. 13, except that the packing 14g is arranged to engage the end wall of the metallic sealing element 12g as well as the wall 9g of the sealing element 8g and the spring 14g' is helically shaped and operates upon the packing similarly to the spring 14b' shown in Fig. 4. In Fig. 15, the sealing element 12h is arranged in close relation to the inner side wall 11h and is formed on its inner wall with a recess 13h, a portion of the wall 11h adjacent its free edge being struck up to form a lug 13h' which extends into the recess to interlock the element 12h and wall 11h together. The packing 14h may be yieldingly held in sealing relation to the element 12h and wall 11h by an annulus 14h' formed of resilient sheet metal, its outer circumferential edge being seated in the corner formed by the walls 9h, 10h, and its inner marginal portion being slitted on radial lines to form resilient fingers 14h'' (see Fig. 16) adapted to engage the packing and yieldably hold it in sealing position and to act therethrough to maintain the sealing element 12h in sealing position against the end wall 7h. The annulus 14h' is shaped to normally act in an inclined direction toward the axis of the shaft 1 so that the packing is pressed toward the adjacent surfaces of the sealing element 12h and wall 11h.

Fig. 17 shows a construction like that shown in Fig. 13 and substantially similar to that shown in Figs. 14 and 15, except that the packing 14i has a central portion engaging the sealing element 12i and lateral portions which engage both of the walls 9i, 11i, of the sealing element 8i, throughout their circumference and I provide an annulus 14i' of substantially U-shape in cross section and formed of resilient sheet metal to engage the packing, the annulus 14i' being yieldably pressed into engagement with the packing by a suitable spring 14i$^x$, which operates therethrough to press the sealing element 12i into sealing relation to the wall 7i. The sides of the annulus are slitted to form spring fingers 14i'' which tend to force the lateral portions of the packing against the walls 9i, 11i.

The packing herein referred to in each embodiment of my invention may be formed of leather, felt or other material. Furthermore, the separate metallic sealing element may be formed of a low friction alloyed metal or wood that has been so treated as to require no lubrication.

It will be noted that those walls of the sealing elements which have pressed-on engagement with the shaft and housing are shaped to permit easy sliding thereon; that is, the forward end of the element fixed to the housing when it is slid into final position is right angled and hence more or less rounded so that it may be readily introduced into the housing and accommodate itself to any irregularity thereof. The element fixed to the shaft is either similarly constructed or its free edge is flared outwardly as shown at 17 in Figs. 5, 10, 11, 13, 14, 15 and 17.

It will be noted that in my construction one metallic sealing element is fixed to each member and a separate metallic sealing element is arranged between the fixed elements but connected to one of them to prevent its rotative movement relative to said fixed element and related to the other to provide a sealing effect; also, in my construction the inner, outer and intermediate sealing elements are not rigidly connected one to another and although the intermediate element is held against rotative movement relative to one of the other elements (by preference, the outer element), it is movable under the influence of pressure to effect a sealing engagement with a portion of the other element and is sized to permit its movement transversely of the inner and outer elements. As a result of this construction, the elements are movable relative to each other to compensate for any abnormal relations between the shaft 1 and housing 2, such as disalignment, eccentricity and non-parallelism of their axes. To seal the space between the separate sealing element and the sealing element to which it is connected, I provide the packing, but as these elements do not rotate relative to each other, no portion of the packing is subjected to friction or wear. The separate or intermediate element is preferably formed of relatively non-flexible metal but may be formed of other substantially rigid material.

My sealing means may be employed to maintain a vacuum on one side thereof or prevent leakage of liquid or a gas under pressure from its opposite side. Where either of these conditions prevails the resulting pressure may be utilized to act on the packing and to maintain the separate sealing element in sealing relation to its related sealing element, the effectiveness of the sealing being proportioned to the pressure. When the assembly includes a spring in engagement with the packing, this pressure supplements the action thereof.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a unitary sealing means, the combination with inner and outer relatively rotatable members, of sheet metal sealing elements each having a side wall fitting one of said members and portions integrally connected to said wall and inter-related with the integral portions of the other element to maintain said elements in assembled relation, an intermediate sealing element formed of substantially rigid material and interlocked to one of said elements and frictionally engaging with an integrally connected portion of the other element, and a sealing means between said intermediate sealing element and the element to which it is locked.

2. In sealing means, the combination with inner and outer relatively rotatable members, of a sealing element formed of resilient sheet metal and having pressed-on engagement with each of said members, one of said elements being provided at one end with a circumferential flange extending toward the other element, an annular metallic sealing element, means for sealing the joint between said metallic sealing element and said other element, and means for maintaining said annular sealing element in yielding engagement with said circumferential flange, said annular sealing element and said flange being capable of movement relative to each other at substantially right angles to said members.

3. In sealing means, the combination with inner and outer relatively movable members, of sheet metal sealing elements fitting said members, one of said elements being provided with circumferential end walls and the other element being disposed in a plane between said end walls, an intermediate sealing element formed of substantially rigid material and interlocked to one of said first mentioned elements, and sealing means between said intermediate sealing element and the first mentioned sealing element to which it is interlocked.

4. In sealing means, the combination with inner and outer relatively rotatable members, of a sealing element formed of resilient sheet metal and having pressed-on engagement with each of said members, one of said elements being provided at one end with a circumferential flange extending toward the other element, an annular metallic sealing element, a packing engaging said annular sealing element and the other pressed-on sealing element, and means yieldingly engaging said packing for maintaining it in operative position and for maintaining said annular sealing element in yielding engagement with said circumferential flange.

5. In sealing means, the combination with inner and outer relatively rotatable members, of a sealing element formed of resilient sheet metal and fixed to said inner member and provided with an end wall or flange, a sealing element formed of resilient sheet metal and fixed to said outer member, an annular metallic sealing element engaging said flange, means for interlocking said annular element to said element fixed to said outer member, means for maintaining said annular element in yielding engagement with said flange, and means for sealing the joint between said annular sealing element and the sealing element fixed to said outer member.

6. In sealing means, the combination with inner and outer relatively movable members, of a unitary device comprising inner and outer sealing elements formed of resilient sheet metal and each having a side wall fitting one of said members and portions integrally connected to said wall and interrelated with the integral portions of the other element, whereby said elements are held in assembled relation, an intermediate sealing element frictionally engaging a portion of one of said elements and interlocked to a portion of the other of said elements, and means for sealing the joint between said intermediate sealing element and the portion of the sealing element to which it is interlocked.

7. In sealing means, the combination with inner and outer relatively movable members, of a unitary device comprising inner and outer sealing elements each having a side wall fitting one of said members and portions integrally connected to said wall and interrelated with the integral portions of the other element, whereby said elements are held in assembled relation, an intermediate sealing element frictionally engaging a portion of one of said elements and interlocked to a portion of the other of said elements, means for sealing the joint between said intermediate sealing element and said other element, and means for yieldingly engaging said intermediate sealing element to maintain it in frictional engagement with said frictionally engaged portion and permitting relative movements of said elements at substantially right angles to their axes.

8. In sealing means, the combination of inner and outer relatively rotatable members, of an inner sealing element having a side wall fitting said inner member and provided at its opposite ends with circumferential flanges, an outer sealing element having a side wall fitting said outer member and provided at one end with an end wall terminating within the flanges of said inner element, an intermediate sealing element between the end wall of said outer element and one of said flanges and frictionally engaging the latter and locked to said outer element, and sealing means between said intermediate sealing element and said outer element.

9. In sealing means, the combination with inner and outer relatively rotatable members, of sealing elements each having a side wall in pressed-on engagement with one of said members and a circumferential end wall, an annular metallic sealing element having a wall engaging the end wall of one of said first mentioned elements and a side wall surrounding the side wall thereof, one of said walls of said annular element being interlocked to the other sealing element to prevent rotation of said annular element, and a packing engaging the end wall of said annular element and side wall of said other element.

10. In sealing means, the combination with inner and outer relatively rotatable members, of a sealing element formed of resilient sheet metal and having a side wall in pressed-on engagement with one of said members and circumferential end walls, a sealing element formed of resilient sheet metal and having a side wall in pressed-on engagement with said other member and an end wall, an annular metallic sealing element interlocked to the last mentioned element to prevent rotation thereof and provided with a circumferential wall, said last mentioned elements being disposed between the end walls of the first mentioned element, and a spring between the end wall of said second mentioned element and the circumferential wall of said annular sealing element and normally tending to press the latter into engagement with the other end wall of said first mentioned element.

11. In sealing means, the combination with inner and outer relatively rotatable members, of an inner sealing element formed of resilient sheet metal and having a side wall in pressed-on engagement with said inner member and an end wall, an outer element formed of resilient sheet metal and having a side wall in pressed-on engagement with said outer member and an end wall, an annular sealing element engaging the end wall of said inner element and interlocked to the side wall of said outer element to prevent rotation of said annular sealing element, a packing engaging said annular element and the side wall of said outer element and a spring between the end wall of said outer element, and said packing and normally tending to maintain it in sealing relation to said annular element and said side wall and through it maintain said annular element in sealing relation to the end wall of said inner element.

12. In sealing means, the combination with inner and outer relatively rotatable members, of an inner sealing element formed of resilient sheet metal and having a side wall in pressed-on engagement with said inner member and an end wall, an outer sealing element formed of resilient sheet metal and having a side wall in pressed-on engagement with said outer member and an end wall at one end disposed axially outwardly of the end wall of said inner element and an inturned flange at its opposite end, an annular metallic sealing element engaging the inner face of the end wall of said inner element and interlocked to the side wall of said outer element to prevent rotation of said annular sealing element, a packing engaging said annular element and the side wall of said outer element, and a spring between said flange and said packing normally tending to maintain the latter in operative position and to act through it to maintain a sealing relation between said annular element and the end wall of said inner element.

13. In sealing means, the combination with inner and outer relatively rotatable members, of an inner sealing element formed of resilient sheet metal and having a side wall in pressed-on engagement with said inner member and an end wall, an outer sealing element formed of resilient sheet metal and having a side wall in pressed-on engagement with said outer member and an end wall provided with an inturned inner side wall, an annular metallic sealing element disposed between the side walls of said outer element and interlocked to one of said walls to prevent rotation of said annular sealing element and engaging the end wall of said inner element, and a packing engaging said annular sealing element and one of the side walls of said outer element, and spring means for maintaining said packing in position.

14. In sealing means, the combination with inner and outer relatively rotatable members, of an inner sealing element formed of resilient sheet metal and having a side wall in pressed-on engagement with said inner member and an end wall, an outer sealing element formed of resilient sheet metal and having a side wall in pressed-on engagement with said outer member and an end wall provided with an inturned inner side wall, an annular metallic sealing element disposed between the side walls of said outer element and interlocked to one of said walls to prevent rotation of said annular sealing element and engaging the end wall of said inner element, and a packing engaging said annular sealing element and one of the side walls of said outer element, and spring means for maintaining said packing in position, said spring means comprising an annular resilient U-shaped member the sides of which consist of fingers normally engaging the side portions of said packing and a spring engaging the central portion of said U-shaped member to yieldingly press the annular sealing element against the end wall of said inner element.

NATHAN F. FRETTER.